(12) United States Patent
Smithline

(10) Patent No.: US 7,979,891 B2
(45) Date of Patent: Jul. 12, 2011

(54) METHOD AND SYSTEM FOR SECURING EXECUTION OF UNTRUSTED APPLICATIONS

(75) Inventor: Neil Smithline, Newton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1201 days.

(21) Appl. No.: 11/430,720

(22) Filed: May 9, 2006

(65) Prior Publication Data
US 2007/0265835 A1 Nov. 15, 2007

(51) Int. Cl.
G06F 7/04 (2006.01)
G06F 9/44 (2006.01)
G06F 17/00 (2006.01)
G06F 17/30 (2006.01)

(52) U.S. Cl. ............... 726/1; 726/2; 713/151; 713/152; 713/167; 717/120; 717/126

(58) Field of Classification Search ..................... None
See application file for complete search history.

(56) References Cited

U.S. PATENT DOCUMENTS

| 6,275,938 | B1 | 8/2001 | Bond et al. | |
|---|---|---|---|---|
| 6,505,300 | B2 | 1/2003 | Chan et al. | |
| 6,829,772 | B2 | 12/2004 | Foote et al. | |
| 7,334,254 | B1 * | 2/2008 | Boydstun et al. | 726/2 |
| 7,451,476 | B1 * | 11/2008 | Banks et al. | 726/1 |
| 2002/0184520 | A1 * | 12/2002 | Bush et al. | 713/200 |
| 2003/0028655 | A1 | 2/2003 | Owhadi | |
| 2006/0150256 | A1 * | 7/2006 | Fanton et al. | 726/27 |

OTHER PUBLICATIONS

Nagappan, et al., "Java 2 Platform Security," Jan. 6, 2006, Inform IT, pp. 1-33.
Fritzinger, et al., "Java Security," 1996, Sun Microsystems, pp. 1-7.
Java 2 Platform Security Architecture Specification, Revision 1.2, Mar. 22, 2002, 39 pages, http://java.sun.com/j2se/1.5.0/docs/guide/security/spec/security-specTOC.fm.html.

* cited by examiner

Primary Examiner — Matthew T Henning
(74) Attorney, Agent, or Firm — Fliesler Meyer LLP

(57) ABSTRACT

In accordance with embodiments, there are provided mechanisms and methods for securing execution of untrusted applications. These mechanisms and methods for securing execution of untrusted applications can enable embodiments to provide a "sandbox" environment in which applications that are less than trusted may execute. The ability of embodiments to provide such a protected environment for executing these untrusted applications can enable systems designers and system programmers to provide additional applications from third parties to users without being overly concerned about system security issues.

18 Claims, 6 Drawing Sheets

METHOD AND SYSTEM FOR SECURING EXECUTION OF UNTRUSTED APPLICATIONS

CROSS REFERENCE TO RELATED APPLICATIONS

The following commonly owned, co-pending United States Patent Application is related to the present application, and is incorporated by reference herein in its entirety:

U.S. patent application Ser. No. 11/430,723 entitled SYSTEM AND METHOD FOR PROTECTING APIs FROM UNTRUSTED OR LESS TRUSTED APPLICATIONS, by Neil Smithline, filed on May 9, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to application servers, and more particularly to a mechanism for securing execution of untrusted applications.

BACKGROUND

In an application server model, an application server provides access to a variety of applications to users throughout an Enterprise Information System (EIS), essentially the data processing power of an enterprise, as well as to users connecting with the application server from remote locations. Java™, an interpreted language, enables the creation of applications that could be run on a wide variety of platforms. This ability to function across a variety of different client platforms, i.e., platform independence, and Java's relatively easy implementation of network applications has resulted in the use of Java™, as well as other programming languages that provide platform independence, in conjunction with application servers to provide processing power in endeavors as basic as personal web pages to endeavors as complex as large business-to-business enterprise systems.

One key component of application server technology is security. However, conventional security models are designed to provide access to all internal Application Programming Interfaces (APIs) to any installed application. Thus, such conventional security models are capable of securing execution only of trusted applications. Such applications include exclusively trusted code, i.e., code provided by a trusted provider under agreement. Accordingly, conventional approaches are restricted to the use of trusted applications installed on conventional application servers.

What is needed is an improved mechanism for securing execution of other than trusted applications.

DETAILED DESCRIPTION

Figure 1A:
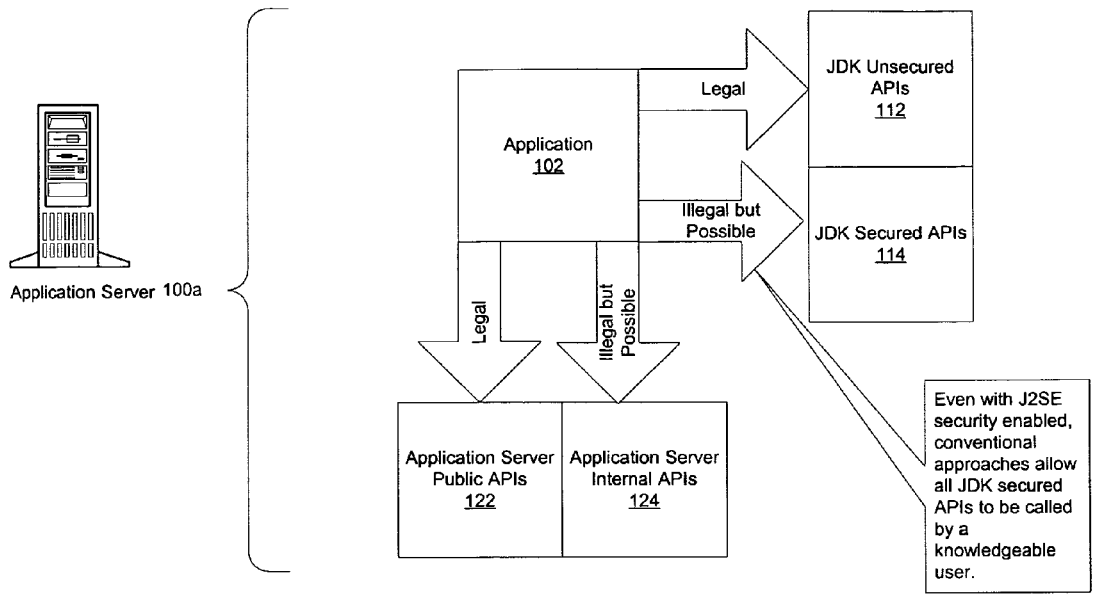
FIGS. 1A-1B are functional block diagrams illustrating a high level overview of an example computing environment in which techniques for securing execution of untrusted applications may be implemented in an embodiment.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for securing execution of untrusted applications. These mechanisms and methods for securing execution of untrusted applications can enable embodiments to provide a "sandbox" environment in which applications that are less than trusted may execute. The ability of embodiments to provide such a protected environment for executing these untrusted applications can enable systems designers and system programmers to provide additional applications from third parties to users without being overly concerned about system security issues.

In an embodiment and by way of example, a method for interoperable management of application servers is provided. The method embodiment includes receiving, from an untrusted application, a request to access a class. The method embodiment includes determining whether the class is permitted to be accessed by untrusted applications. The untrusted application may be permitted to access the class when the class is one that is permitted to be accessed by untrusted applications.

In another embodiment and by way of example, a method for securing execution of untrusted applications is provided. The method embodiment includes sending, from an untrusted application, a request to an application server to access a class maintained by the application server with an internal API separate from a public API of the application server. Permission to access the class may be received when the application server has determined that the class is permitted to be accessed by untrusted applications.

As used herein, the term untrusted application refers to any application that falls short in some way of meeting the requirements of a trusted application. While trusted applications include exclusively trusted code, i.e., code provided by a trusted provider under agreement or tested to a specification, untrusted applications can include applications or other code provided by third parties not bound, contractually or otherwise, to meet standards or interface requirements of software executing on the application server. Some examples of instances where use of untrusted applications would be desirable include without limitation:

Deploying a partner's application in a secured domain

An Application Service Provider (ASP) deploying a client's application

Deploying a simple utility written by a less trusted developer (e.g.: a mortgage rate calculator on a banks loan site).

While the present invention is described with reference to an embodiment in which techniques for securing execution of untrusted applications are implemented in an application server in conformance with the J2EE Management Framework using executable programs written in the Java™ programming language, the present invention is not limited to the J2EE Management Framework nor the Java™ programming language. Embodiments may be practiced using other inter-connectivity specifications or programming languages, i.e., JSP and the like without departing from the scope of the embodiments claimed. (Java™ is a trademark of Sun Microsystems, Inc.).

Figure 1B:
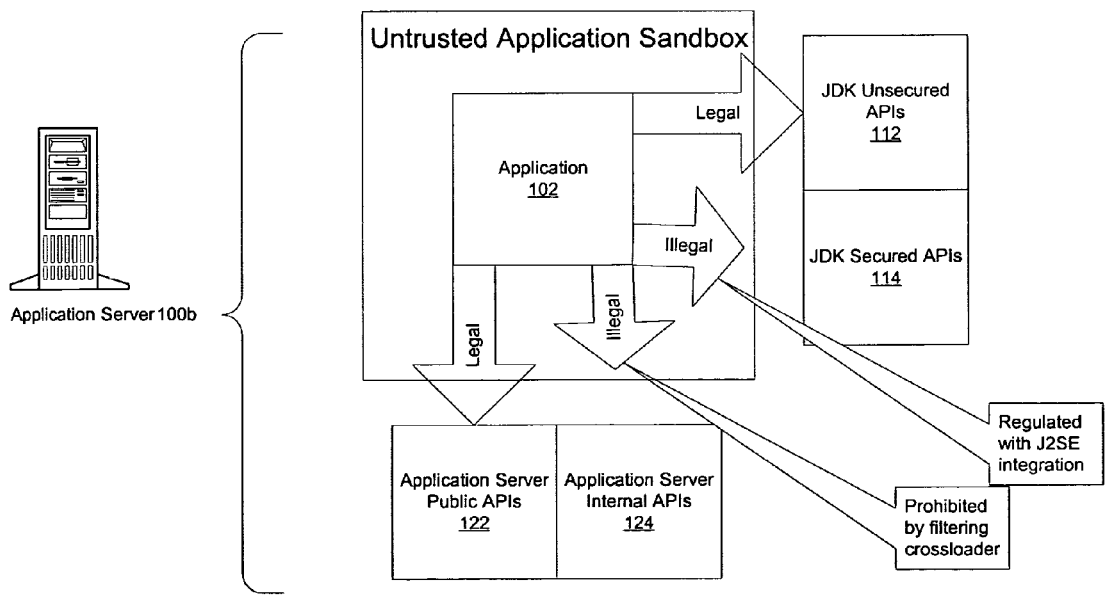

FIGS. 1A-1B are functional block diagrams illustrating a high level overview of an example computing environment in which techniques for securing execution of untrusted applications may be implemented in an embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As shown in FIG. 1A, an application server 100 that employs a J2EE management framework provides a mechanism in which one or more applications 102 can execute using resources available on the application server 100. In one embodiment, the application server 100 utilize an application server product, such as WebLogic® Server by BEA systems of San Jose, Calif.

In an embodiment, an application server's internal APIs may be maintained in separate classes than public APIs to facilitate protecting these APIs. While application specific exceptions can exist, such separation is generally enforced. Once internal APIs are in separate classes from public APIs, embodiments can protect internal classes (i.e.: classes that have only internal methods on them) from accesses by untrusted applications. Embodiments may protect internal classes either by using a modified existing application class-loader or adding a new classloader for applications that, by default, denies access to internal methods. A method embodiment for protecting the internal classes will be described with reference to FIGS. 2A-2C.

Figure 2A:
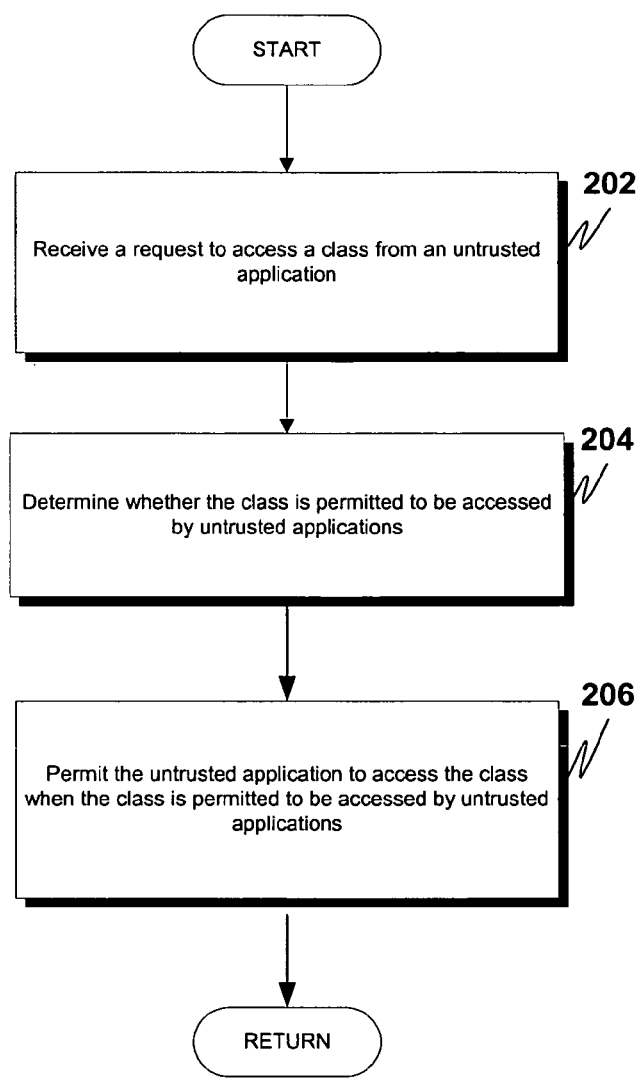
FIGS. 2A-2D are operational flow diagrams illustrating a high level overview of a technique for securing execution of untrusted applications in an embodiment.

FIG. 2A is an operational flow diagram illustrating a high level overview of a technique for securing execution of untrusted applications in an embodiment. The technique for securing execution of untrusted applications shown in FIG. 2A is operable with an application, such as application 102 of FIGS. 1A-1B for example. As shown in FIG. 2A, a request to access a class is received from an untrusted application (block 202). Then, a determination is made whether the class is permitted to be accessed by untrusted applications (block 204). The untrusted application may be permitted to access the class when the class is determined to be a class permitted to be accessed by untrusted applications (block 206).

Figure 2B:
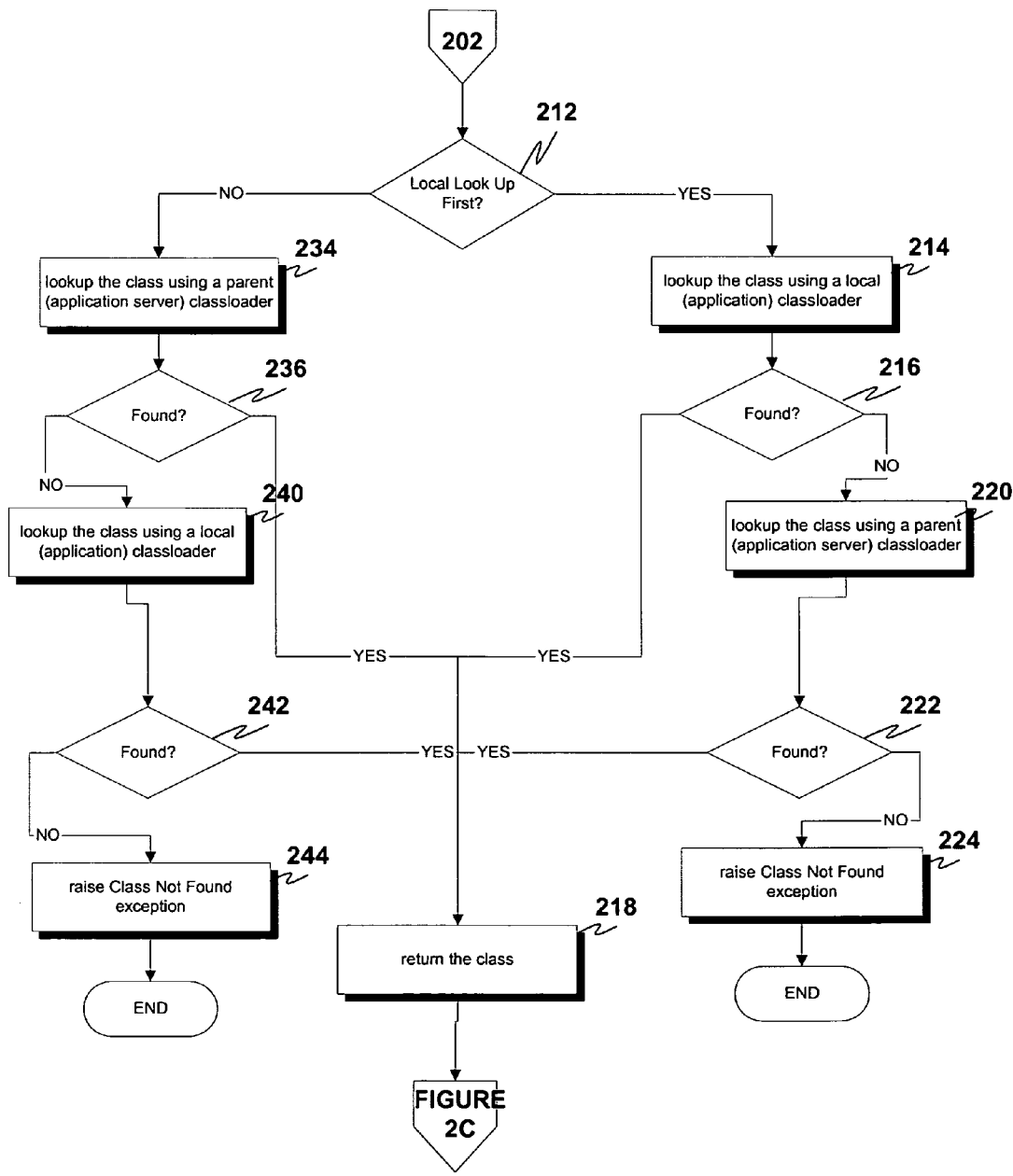
Figure 2C:
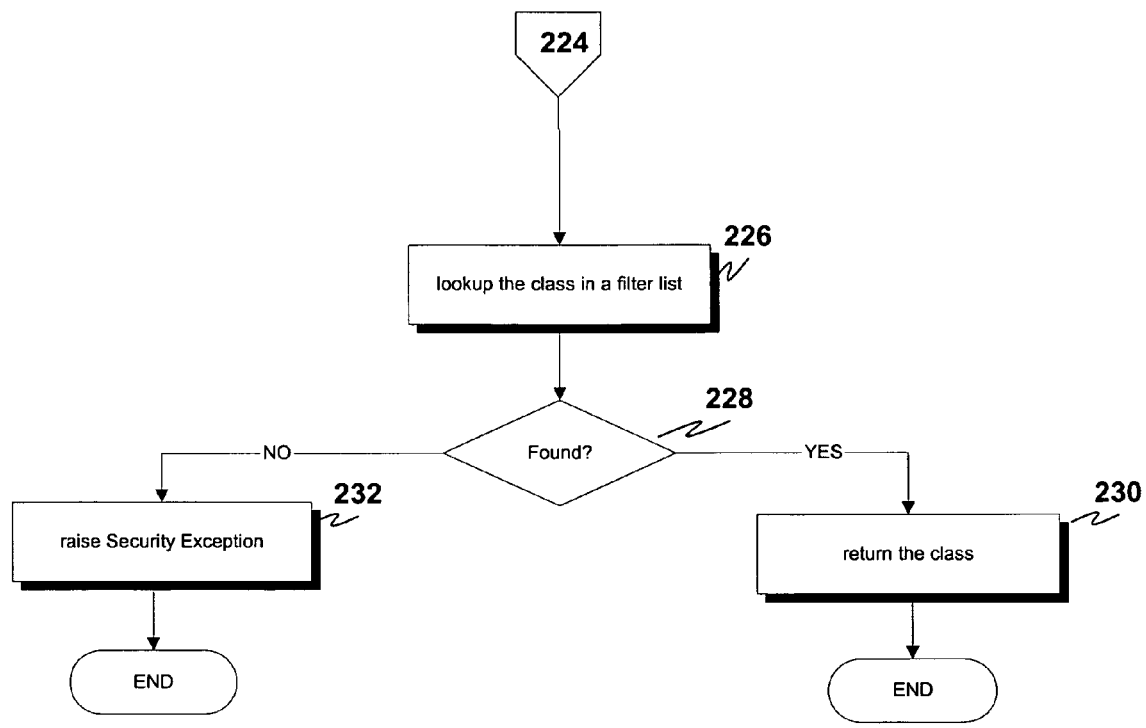

FIGS. 2B-2C are operational flow diagrams illustrating a high-level overview of a technique for securing execution of untrusted applications based upon filtering in an embodiment. As shown in FIG. 2B, if the classloader is configured to lookup the class in the application first (block 212), then lookup the class using a local (application) classloader (block 214) and return if found (blocks 216-218). Otherwise, if not found, lookup the class in the in a parent (application server) classloader (block 220). If the class is not found (block 222), return ClassNotFoundException (block 224). Otherwise, if the class is found (block 222), lookup the class in a filter list, which may comprise a public WebLogic Server method list and special WebLogic Server methods in an embodiment, (FIG. 2C, block 226). If class is in filter list (block 228), then return the class (block 230). Otherwise, raise a Security Exception (block 232).

If the classloader is configured to lookup in application last (block 212), then lookup class in the parent (application server) classloader prior to looking up the class in the local (application) classloader and return if found (blocks 232-244).

Figure 2D:
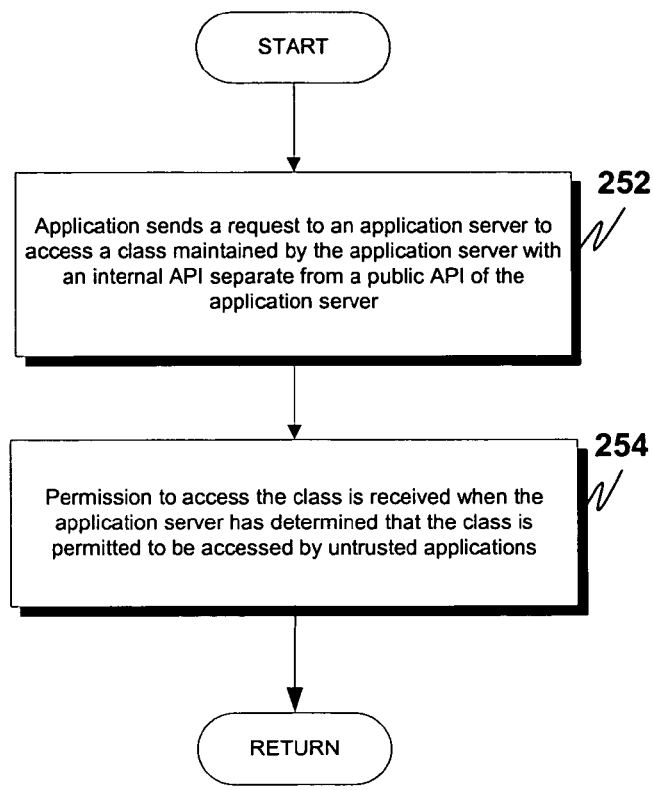

FIG. 2D is an operational flow diagram illustrating a high level overview of a technique for securing execution of untrusted applications in an embodiment. The technique for securing execution of untrusted applications shown in FIG. 2D is operable with an application, such as application 102 of FIGS. 1A-1B for example. As shown in FIG. 2D, the application sends a request to an application server to access a class maintained by the application server with an internal API separate from a public API of the application server (block 252). Permission to access the class is received when the application server has determined that the class is permitted to be accessed by untrusted applications (block 254).

In an embodiment, the filter list contains exactly the classes that are documented in javadoc. The weblogic*.xml files will allow appending to the filter list for that unit (e.g.: weblogic-ejb-jar.xml adds to the filter list for the ejb.jar file, weblogic-application.jar for the entire ear).

Integration for layered products can comprise two facets. The first facet includes allowing layered products to co-exist with the filtering classloader and still be able to call APIs familiar to the layered product. Certain extensions to weblogic*.xml files could be used to handle this case. The second facet of layered product integration includes allowing layered products to extend this solution to protect the layered product's internal APIs from application code.

In another embodiment, access to secured JDK APIs may be closed by integrating application server components with J2SE security. To demonstrate the advantages of such integration, an overview of J2SE security in general is provided. A more detailed description can be found in the Java 2 Platform Security Architecture Specification.

Each class in Java has associated with it a "codebase". This roughly corresponds to the element of the classpath from which the class was loaded. There is a policy file that contains mappings of permissions to codebases. For example:

grant codeBase "/mylib.jar" {permission java.io.FilePermission "/foo/bar", "read";}

This gives any class loaded from mylib.jar permission to read the file /foo/bar. Many operations within the JVM are secured including file I/O, network operations, JVM property system operations, classloader operations, and the like. When a program tries to execute a secured operation, an access check occurs. Consider the following call stack with associated set of permissions (the notation of the method name and relevant parameters on the left and any relevant permissions on the right is used throughout):

```
java.io.File.read("/foo/bar")
mylib.jar.MyClass.main( )      java.io.FilePermission("/foo/bar", "read")
```

(Note that pseudocode is used throughout for clarity. For example, there is no method File.read( ), it is clear to the ordinary skilled person what it would do if it existed.) When the read call executes, it begins to walk the stack and intersects the permissions for its callers. In this case there is only a single caller. Once it is done and has obtained the intersected set of permissions, it sees if the intersected set of permissions implies the desired set of permissions and, if so, permits the operation.

For the sake of this example, consider a method in an application server, updateLogFile( ), that writes to a log file. Now consider this simplified snippet from an embodiment's policy file:
    grant codeBase "/weblogic.jar" {permission java.security-.AllPermission;}

"AllPermission" means all permissions. When intersected with any set of permissions X, it results in the initial set of permissions X. So consider this pseudo-realistic call stack:

```
java. io.File.write("logFile")
Weblogic.jar.MyClass.updateLogFile( )   java.security.AllPermission
Weblogic.jar.JmsSomethingOrOther( )     java.security.AllPermission
userApplication.war.Main( )             Some small set of privileges
                                        only relevant to the
                                        application
Weblogic.jar. ServletDispatcher( )      java.security.AllPermission
Other weblogic jar stack frames
```

When J2SE security is enabled, this call will fail because the userApplication.war does not have write permission to logFile and this frame is on the stack and will be included in the intersection of permissions. So, one solution is to tell customers to grant a whole slew of permissions to all applications thereby watering down J2SE security to no real protection at all. J2SE does provide for a much better solution that involves code modification. This involves using a marker class called PrivilegedAction that is like Runnable but with a different name. To use this, one would need to replace:
    AccessController.doPrivileged(new PrivilegedAction ( ) {
    With

```
public Object run( ) { File.write("logFile");
}
```

While this does not change the logic of the execution, it does act as a marker to the J2SE security. When the intersection algorithm runs into a call to AccessController.doPrivileged( ) it proceeds to intersect one more frame's permission and then stops. So, in the new call stack:

```
java. io.File.write("logFile")
Weblogic.jar.MyClass.updateLogFile( )   java.security.AllPermission
java.security.AccessController.
doPrivileged( )
Weblogic.jar.JmsSomethingOrOther( )
```

The user's code is not included in the intersection and hence the write operation succeeds.

The work required to protect the secured JDK operations is to wrap calls to secure JDK APIs that are occurring on behalf of the application server in doPrivileged( ) calls. By "on behalf of the application server", it is intended to mean that the user has not asked the server to execute a secure JDK operation explicitly for them. Rather, as in the case of the logging example above, the user has performed some application server operation and one or more secure JDK operations must happen during the execution of the application server operation. In an embodiment, some PrivilegedAction pooling mechanism can be put in place to ensure that there is not a performance degradation by object creation.

Layered products need very little integration with such a solution. One component that layered products need to do is to be able to escalate their own privileges, which layered products could achieve via deployment descriptor attributes.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for securing execution of untrusted applications as discussed herein.

Figure 3:
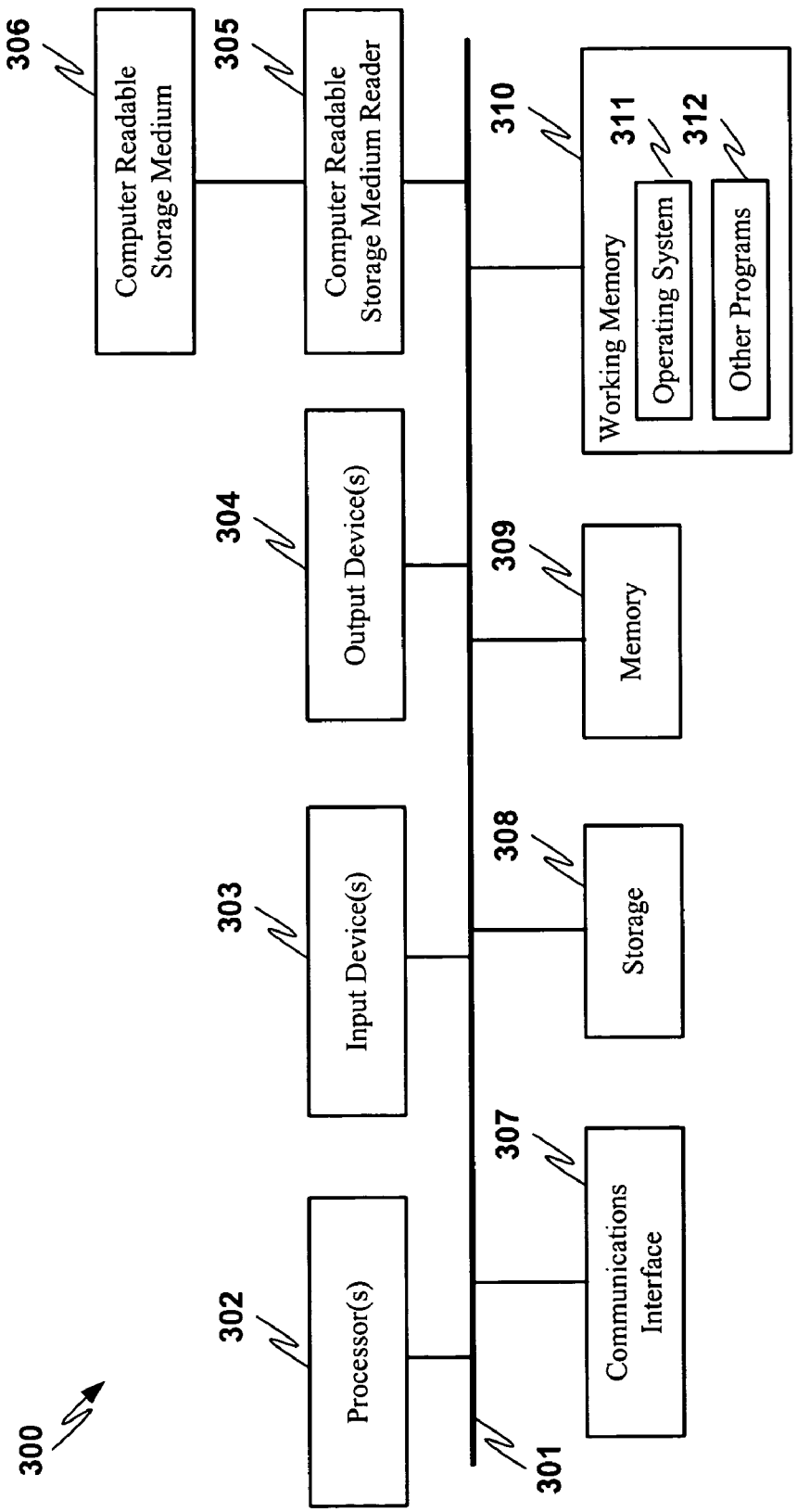
FIG. 3 is a hardware block diagram of an example computer system, which may be used to embody one or more components in an embodiment.

FIG. 3 illustrates a processing system 300, which can comprise one or more of the elements of FIGS. 1A and 1B. Turning now to FIG. 3, a computing system is illustrated that may comprise one or more of the components of FIGS. 1A and 1B. While other alternatives might be utilized, it will be presumed for clarity sake that components of the systems of FIGS. 1A and 1B are implemented in hardware, software or some combination by one or more computing systems consistent therewith, unless otherwise indicated.

Computing system 300 comprises components coupled via one or more communication channels (e.g., bus 301) including one or more general or special purpose processors 302, such as a Pentium®, Centrino®, Power PC®, digital signal processor ("DSP"), and so on. System 300 components also include one or more input devices 303 (such as a mouse, keyboard, microphone, pen, and so on), and one or more output devices 304, such as a suitable display, speakers, actuators, and so on, in accordance with a particular application. (It will be appreciated that input or output devices can also similarly include more specialized devices or hardware/software device enhancements suitable for use by the mentally or physically challenged.)

System 300 also includes a machine readable storage media reader 305 coupled to a machine readable storage medium 306, such as a storage/memory device or hard or removable storage/memory media; such devices or media are further indicated separately as storage 308 and memory 309, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 307 may also be included, such as a modem, DSL, infrared, RF or other suitable transceiver, and so on for providing inter-device communication directly or via one or more suitable private or public networks or other components that may include but are not limited to those already discussed.

Working memory 310 further includes operating system ("OS") 311 elements and other programs 312, such as one or more of application programs, mobile code, data, and so on for implementing system 300 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 312 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 308 or memory 309) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for securing access to classes by untrusted applications, the method comprising:
   providing, at a computer which includes a computer readable medium and a processor, a plurality of class files, wherein internal Application Programming Interfaces (APIs) and public APIs are maintained in separate class files;
   providing a filtering classloader which is configured to
      look-up a requested class,
      compare the requested class to a filter list, and
      by default, deny access to internal class file APIs;
   receiving at the computer, a request from an untrusted application to access a class stored on the computer;
   looking up the requested class by
      looking-up the class using a local classloader and,
      returning the class if the class is found using the local classloader or,
      if the class is not found using the local classloader, then looking-up the class using the filtering classloader and,
      returning the class if the class is found using the filtering classloader;
   if the class is not found by using either the local classloader or the filtering classloader then returning an exception;
   if the class is found by the filtering classloader then looking-up the class in a filter list which includes a plurality of documented classes available to untrusted applications; and
   if the class is in the filter list, then permitting the untrusted application to access the class.

2. The method of claim 1, wherein receiving, from an untrusted application, a request to access a class includes:
   receiving the request from an application that falls short of meeting the requirements of a trusted application.

3. The method of claim 2, wherein receiving the request from an application that falls short of meeting the requirements of a trusted application includes:
   receiving the request from code provided by third parties not bound to meet standards or interface requirements of software executing on the application server.

4. The method of claim 1, further comprising:
   denying access to the class when the class is not in the filter list.

5. The method of claim 1 further comprising:
   determining whether to look-up the class using local classloader first or the filtering classloader first.

6. The method of claim 5, further comprising:
    searching for the class in an application class list first when the local classloader is configured to look-up the class first.

7. A non-transitory computer readable storage medium carrying one or more sequences of instructions for securing access to classes by untrusted applications, which instructions, when executed by one or more processors, cause the one or more processors to carry out the steps of:
    maintaining internal Application Programming Interfaces (APIs) and public APIs in separate class files;
    adding a filtering classloader, wherein the filtering classloader is configured to
        look-up a requested class and, if found, compare the requested class to a filter list, and
        by default, deny access to internal class files;
    receiving at a computer including a computer readable medium and processor operating thereon, a request from an untrusted application to access a class stored on the computer;
    looking-up the class using a local classloader;
    returning the class if the class is found using the local classloader;
    if the class is not found, looking-up the class using a filtering classloader;
    returning the class if the class is found using the classloader;
    if the class is not found by either the local classloader or the filtering classloader then returning an exception;
    if the class is found by the filtering classloader then looking-up the class in a filter list which includes a plurality of documented classes available to untrusted applications; and
    if the class is in the filter list, then permitting the untrusted application to access the class.

8. The non-transitory computer readable storage medium as recited in claim 7, wherein the instructions for carrying out the step of receiving, from an untrusted application, a request to access a class include instructions for carrying out the step of:
    receiving the request from an application that falls short of meeting the requirements of a trusted application.

9. The non-transitory computer readable storage medium as recited in claim 8, wherein the instructions for receiving the request from an application that falls short of meeting the requirements of a trusted application include instructions for carrying out the step of:
    receiving the request from code provided by third parties not bound to meet standards or interface requirements of software executing on the application server.

10. The non-transitory computer readable storage medium as recited in claim 7, further comprising instructions for carrying out the step of:
    denying access to the class when the class is not in the filter list.

11. The non-transitory computer readable storage medium as recited in claim 7, further comprising instructions for carrying out the step of:
    determining whether to lookup the class using the local classloader first or the filtering classloader first.

12. The non-transitory computer readable storage medium as recited in claim 11, further comprising instructions for carrying out the step of:
    searching for the class in an application class list first when the local classloader is configured to look up the class first.

13. A system for securing access to internal classes by untrusted applications, comprising:
    a computer, including a computer readable medium and processor operating thereon;
    a plurality of Application Programming Interfaces (APIs) including a set of internal APIs and a set of public APIs;
    a plurality of classes including a set of internal classes and a set of public classes, wherein the set of internal APIs are maintained in the set of internal classes and the set of public APIs are maintained in the set of public classes;
    a filtering classloader which, by default, grants access to the internal classes only to trusted applications;
    wherein, when a request to access an internal API is received, the system
        determines whether the request is from an untrusted application,
        determines whether the internal API can be accessed by the untrusted application using the filtering classloader, and
        grants access to the internal API.

14. The system of claim 13 further comprising:
    a security service which checks permissions associated with each class before the system grants access to any class by any application.

15. The system of claim 14 wherein the permissions associated with each class are stored in a policy file which maps permissions to classes.

16. The system of claim 15 wherein the policy file can be updated with new permissions for new applications.

17. The system of claim 13 wherein when a request is received at the system from an untrusted application which invokes a call by the system to an internal API, the call is wrapped using a marker class that permits execution of the call.

18. The system of claim 13 wherein layered products are always granted access to those APIs familiar to the layered products.

* * * * *